(12) United States Patent
Yamashita et al.

(10) Patent No.: US 8,187,734 B2
(45) Date of Patent: May 29, 2012

(54) PROTON-CONDUCTING POLYMER COMPOSITION AND METHOD FOR PREPARATION THEREOF, CATALYST INK CONTAINING SAID PROTON-CONDUCTING POLYMER COMPOSITION AND FUEL CELL INCLUDING SAID CATALYST INK

(75) Inventors: Masahiro Yamashita, Otsu (JP); Kota Kitamura, Otsu (JP); Yoshimitsu Sakaguchi, Otsu (JP)

(73) Assignee: Toyo Boseki Kabushiki Kaisha, Osaka-Shi (JP)

( * ) Notice: Subject to any disclaimer, the term of this patent is extended or adjusted under 35 U.S.C. 154(b) by 1335 days.

(21) Appl. No.: 11/718,672

(22) PCT Filed: Nov. 7, 2005

(86) PCT No.: PCT/JP2005/020353
§ 371 (c)(1),
(2), (4) Date: May 4, 2007

(87) PCT Pub. No.: WO2006/051748
PCT Pub. Date: May 18, 2006

(65) Prior Publication Data
US 2009/0269643 A1    Oct. 29, 2009

(30) Foreign Application Priority Data

Nov. 10, 2004  (JP) ................................. 2004-326323
Feb. 24, 2005  (JP) ................................. 2005-048844
Jul. 29, 2005  (JP) ................................. 2005-221063

(51) Int. Cl.
*H01M 8/10*   (2006.01)

(52) U.S. Cl. ............................ 429/33; 528/170; 528/373

(58) Field of Classification Search ................... 429/33; 528/170, 373
See application file for complete search history.

(56) References Cited

U.S. PATENT DOCUMENTS 5,716,746 A * 2/1998 Mikuriya et al. .......... 430/109.3
5,741,617 A * 4/1998 Inaba et al. ................ 430/108.4
(Continued)

FOREIGN PATENT DOCUMENTS
CN        1269429 A     10/2000
(Continued)

OTHER PUBLICATIONS

European Patent Office, Supplementary European Search Report in corresponding European Patent Application No. 05 80 0399.7, mailed Nov. 27, 2008, Munich.

(Continued)

*Primary Examiner* — Peter D. Mulcahy
*Assistant Examiner* — Henry Hu
(74) *Attorney, Agent, or Firm* — Kenyon & Kenyon LLP

(57) ABSTRACT

A proton-conducting polymer composition which contains an aromatic hydrocarbon type of proton-conducting polymer in an amount of 1 to 30 mass %, wherein a component of said proton-conducting polymer having a molecular weight in the range of 2,000 to 230,000 in terms of polyethylene glycol accounts for 10 mass % or more of the total amount of said proton-conducting polymer; a method for preparing the proton-conducting polymer composition, a catalyst ink comprising the proton-conducting polymer composition and a fuel cell including the catalyst ink. The above proton-conducting polymer composition can well exploit the performance capability of a catalyst of a fuel cell, especially when it is allowed to be present with the electrode of a fuel cell.

19 Claims, 1 Drawing Sheet

U.S. PATENT DOCUMENTS

| | | | |
|---|---|---|---|
| 7,285,616 | B2 | 10/2007 | Yoshimura et al. |
| 2002/0091225 | A1* | 7/2002 | McGrath et al. ............... 528/170 |
| 2003/0118885 | A1 | 6/2003 | Terahara et al. |
| 2003/0180596 | A1 | 9/2003 | Yoshimura et al. |
| 2004/0058214 | A1 | 3/2004 | Mehler et al. |

FOREIGN PATENT DOCUMENTS

| | | | |
|---|---|---|---|
| CN | 1427027 | A | 7/2003 |
| EP | 0 505 582 | A1 | 9/1992 |
| EP | 1321996 | A1 * | 6/2003 |
| EP | 1321996 | A1 * | 8/2003 |
| EP | 1810997 | A1 * | 7/2007 |
| JP | 06-093114 | A | 4/1994 |
| JP | 2884189 | | 2/1999 |
| JP | 2000-188110 | A | 7/2000 |
| JP | 2003-249244 | A | 9/2003 |
| JP | 2003-317749 | A | 11/2003 |
| JP | 2003-317750 | A | 11/2003 |
| JP | 2004-055522 | a | 2/2004 |
| JP | 3523853 | | 2/2004 |
| JP | 2004-273434 | A | 9/2004 |
| JP | 2004-307629 | A | 11/2004 |
| JP | 2005-108827 | A | 4/2005 |
| JP | 2005-232439 | A | 9/2005 |
| WO | 03/082956 | A1 | 10/2003 |
| WO | WO-03/082956 | A1 * | 10/2003 |
| WO | WO-2006/051748 | A1 * | 5/2006 |

OTHER PUBLICATIONS

R. Nolte, et al., *Partially sulfonated poly(arylene ether sulfone)—A versatile proton conducting membrane material for modern energy conversion technologies*, Journal of Membrane Science, vol. 83, 1993, pp. 211-220.

Yu Seung Kim, et al., *Effect of Interfacial Resistance on Long Term performance of Direct Methanol Fuel Cells*, Abs. 334, 205th Meeting of the Electrochemical Society, May 2004.

Takeshi Kobayashl, et al., *Proton-conducting polymers derived from poly(ether-etherketone) and poly(4-phenoxyenzoyl-1,4-phenylene)*, Solid State Ionics, vol. 106, Feb. 1998, pp. 219-225.

Jasun Lee, et al., *Polyaromatic Ether-Ketone Sulfonamides Prepared from Polydiphenyl Ether-Ketones by Chlorosulfonation and Treatment with Secondary Amines*, Journal of Polymer Science, Polymer Chemistry.

B.C. Johnson, et al., *Synthesis and Characterization of Sulfonated Poly(arylene Ether Sulfones)*, Journal of Polymer Science, Polymer Chemistry Edition, vol. 22, No. 3, Mar. 1984, pp. 721-737.

Takeshi Ogawa, et al., *Polyaromatic Ether-Ketones and Ether-Keto-Sulfones Having Various Hydrophilic Groups*, Journal of Polymer Science, Polymer Chemistry Edition, vol. 23, No. 4, Apr. 1985, pp. 1231-1241.

Chinese Office Action in Chinese Application No. 200580038417.6, mailed Jun. 26, 2009.

Taiwanese Patent Office; Office Action, mailed Sep. 22, 2008, in Taiwanese Patent Application No. 094139212.

* cited by examiner

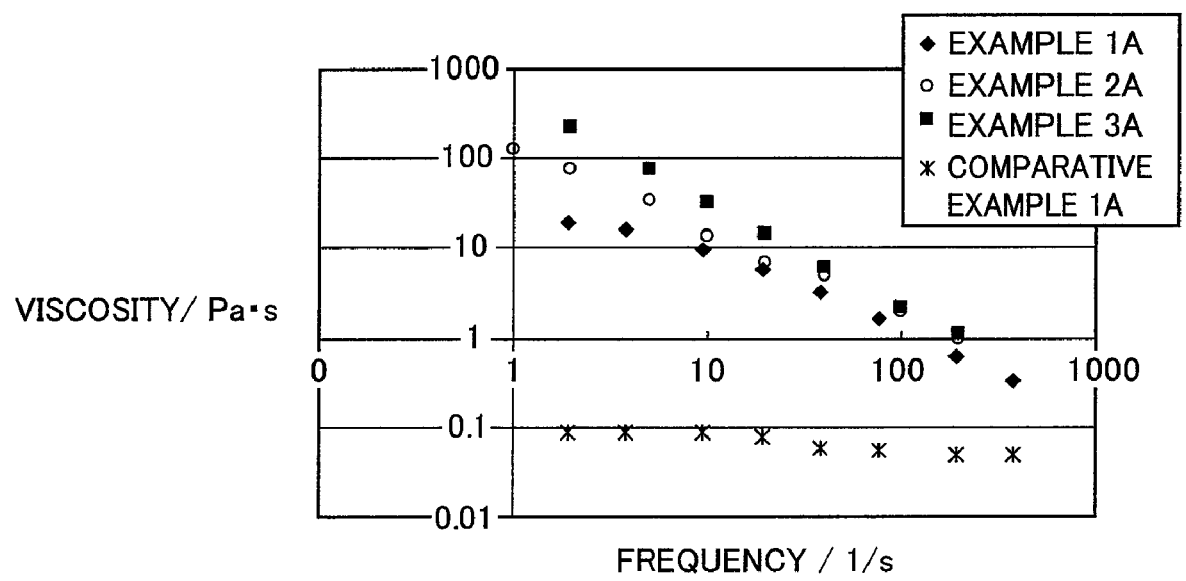

PROTON-CONDUCTING POLYMER COMPOSITION AND METHOD FOR PREPARATION THEREOF, CATALYST INK CONTAINING SAID PROTON-CONDUCTING POLYMER COMPOSITION AND FUEL CELL INCLUDING SAID CATALYST INK

This is a 371 national phase application of PCT/JP2005/020353 filed 07 Nov. 2005, claiming priority to Japanese Patent Applications No. 2004-326323 filed 10 Nov. 2004, No. 2005-048844 filed 24 Feb. 2005, and No. 2005-221063 filed 29 Jul. 2005, respectively, the contents of which are incorporated herein by reference.

TECHNICAL FIELD

The present invention relates to a proton-conducting polymer composition containing an aromatic ring hydrocarbon-based proton-conducting polymer and a solvent, and more particularly, it relates to a proton-conducting polymer composition suitable for forming catalyst layers of a fuel cell electrode.

BACKGROUND ART

A polymer electrolyte fuel cell or a hydroelectrolytic cell can be listed as an exemplary electrochemical apparatus employing a solid polyelectrolyte as an ion conductor in place of a liquid electrolyte. The polymer electrolyte fuel cell includes a fuel cell fueled by hydrogen gas and a fuel cell fueled by a mixed solution of a hydrocarbon-based fuel represented by methanol and water. Structurally, an electrode-electrolyte membrane assembly prepared by holding an electrolyte membrane (also referred to as a polymer electrolyte membrane, an ion-exchange membrane, a proton-exchange membrane or a proton-conducting polymer film) having proton conductivity with a pair of electrodes causes oxidative reaction in the first electrode and reductive reaction in the second electrode, to operate as a cell or a hydroelectrolytic cell.

The polymer electrolyte membrane employed therefor must be chemically, thermally, electrochemically and mechanically sufficiently stable along with proton conductivity as a cation-exchange membrane. Therefore, a perfluorocarbon sulfonic acid membrane (fluoric proton-conducting polymer) represented by "Nafion (registered trademark)" by Du Pont, U.S.A. has been mainly used as that usable over a long period. If a membrane of Nafion (registered trademark) is driven under a temperature condition exceeding 100° C., however, the water content in the membrane abruptly lowers and the membrane is remarkably softened. Therefore, the working temperature is disadvantageously limited. When a fluoric proton-conducting polymer membrane is used for a fuel cell fueled by a hydrocarbon-based liquid fuel such as methanol, methanol permeates the membrane to remarkably reduce the performance, leading to a significant problem. Further, it is pointed out that the film is so high-priced as to hinder practicalization.

In order to overcome such problems, various studies are conducted on a polymer electrolyte membrane composed of a non-fluoric proton-conducting polymer prepared by introducing a proton-conducting functional group such as a sulfonic acid group or a phosphonic acid group into an aromatic hydrocarbon-based polymer as a substitute for the fluoric proton-conducting polymer. As to the polymer skeleton, an aromatic compound such as aromatic polyarylene, aromatic polyarylene ether ketone or aromatic polyarylene ether sulfone can be captured as a prospective structure in consideration of heat resistance and chemical stability, and a structure obtained by sulfonating polyaryl ether sulfone (refer to Journal of Membrane Science) (Netherlands), 1993, Vol. 83, pp. 211-220 (Non-Patent Document 1) and Specification of U.S. Publication No. 2002/0091225 (Patent Document 2), for example) and a structure obtained by sulfonating polyether ether ketone (refer to Japanese Patent Laying-Open No. 6-93114 (Patent Document 2), for example) are reported.

A polymer electrolyte membrane composed of the aforementioned non-fluoric proton-conducting polymer is regarded as prospective due to such advantages that the film is less deformed under a high temperature dissimilarly to a fluoric proton-conducting polymer membrane and less permeated by methanol upon application to a fuel cell fueled by a liquid fuel such as methanol and a cost expectedly lower than that of the fluoric proton-conducting polymer. For the future, development making the best use of the characteristics of each polymer is expected.

The electrodes used in the aforementioned electrode-electrolyte membrane assembly prepared by stacking the electrodes on the electrolyte membrane are generally prepared by applying a catalyst ink obtained by mixing a composition prepared by dissolving or dispersing a fluoric proton-conducting polymer in solvent or the like and a catalyst suitable for fuel cell reaction with each other onto gas diffusion layers or films and removing the solvent. Thereafter the electrodes are transferred to the electrolyte membrane, thereby forming the electrode-electrolyte membrane assembly (refer to Japanese Patent No. 3523853 (Patent Document 3), for example). A method directly applying a catalyst ink onto an electrolyte membrane or indirectly applying the former to the latter with a spray or the like is also studied.

Various methods are studied for preparing an electrode-electrolyte membrane assembly with an electrolyte membrane composed of a non-fluoric proton-conducting polymer. The non-fluoric proton-conducting polymer has properties different from those of the fluoric proton-conducting polymer, and hence it is necessary to improve bondability between electrodes and the electrolyte membrane. For example, each of Japanese Patent Laying-Open No. 2003-317749 (Patent Document 4), Japanese Patent Laying-Open No. 2003-317750 (Patent Document 5), Japanese Patent Laying-Open No. 2004-55522 (Patent Document 6) and Japanese Patent Laying-Open No. 2003-249244 (Patent Document 7) shows a method of forming an electrode-electrolyte membrane assembly by applying and drying a non-fluoric proton-conducting polymer solution to and on electrodes (including catalyst layers containing a metal catalyst and a fluoric proton-conducting polymer) for a fuel cell, while a study on a polymer solution and a dispersion suitable for such a method is also conducted (refer to Japanese Patent Laying-Open No. 2003-317749 (Patent Document 8)).

Whichever method is employed, it is important to derive the characteristics of the electrodes or the electrolyte membrane in excellent form for the electrode-electrolyte membrane assembly, while material transfer of protons and reaction gas in the electrodes is desirably smooth so that the catalytic performance is excellently derived in relation to the electrodes, and bondability to the electrolyte membrane must also be rendered excellent.

From the aforementioned viewpoint, a method of interposing a composition of a fluoric proton-conducting polymer having a similar structure between electrodes is employed with respect to a conventional fluoric proton-conducting polymer membrane, and a composition or a catalyst ink containing a fluoric proton-conducting polymer suitable therefor is also prepared (refer to Japanese Patent Laying-Open No. 2005-108827 (Patent Document 9), Japanese Patent Laying-Open No. 2000-188110 (Patent Document 10) and Japanese Patent Laying-Open No. 2004-273434 (Patent Document 11), for example). In this case, bondability between the electrodes and the electrolyte membrane can also be maintained excellent due to similar physical properties of the polymers.

While an electrolyte membrane composed of an aromatic hydrocarbon-based proton-conducting polymer is also studied from such a viewpoint that an aromatic hydrocarbon-based polymer electrolyte membrane can stably operate over a longer period when bonded to electrodes holding an aromatic hydrocarbon-based proton-conducting polymer therebetween, the composition interposed between the electrodes is not sufficiently studied. For example, while Japanese Patent Laying-Open No. 2003-317749 (Patent Document 12) shows a composition prepared by dissolving a non-fluoric proton-conducting polymer, this composition is improved in durability when forming an electrolyte membrane by application/formation to/on electrodes (commercially available electrodes containing Nafion (registered trademark) are employed for the electrodes), and a composition according to Japanese Patent Laying-Open No. 2003-249244 (Patent Document 13) is that suitable for forming an electrolyte membrane by casting and not designed to be interposed between electrodes.

Whichever method is employed for preparing an electrode-electrolyte membrane assembly, a fluoric proton-conducting polymer is generally used as the proton-conducting polymer interposed between electrodes also when an electrolyte membrane composed of a non-fluoric proton-conducting polymer is used. It is reported that such an assembly, prepared by bonding different types of polymers to each other, leads to a problem in bondability between the polymers when looked from medium- and long-term perspectives (refer to 205$^{th}$ Electrochemical Society Meeting Abs No. 334 (Non-Patent Document 2)). Further, there has also been room for improvement in relation to homogeneity of catalyst layers.

Patent Document 1: Specification of U.S. Publication No. 2002/0091225

Patent Document 2: Japanese Patent Laying-Open No. 6-93114

Patent Document 3: Japanese Patent No. 3523853

Patent Document 4: Japanese Patent Laying-Open No. 2003-317749

Patent Document 5: Japanese Patent Laying-Open No. 2003-317750

Patent Document 6: Japanese Patent Laying-Open No. 2004-55522

Patent Document 7: Japanese Patent Laying-Open No. 2003-249244

Patent Document 8: Japanese Patent Laying-Open No. 2003-317749

Patent Document 9: Japanese Patent Laying-Open No. 2005-108827

Patent Document 10: Japanese Patent Laying-Open No. 2000-188110

Patent Document 11: Japanese Patent Laying-Open No. 2004-273434

Patent Document 12: Japanese Patent Laying-Open No. 2003-317749

Patent Document 13: Japanese Patent Laying-Open No. 2003-249244

Non-Patent Document 1: Journal of Membrane Science (Netherlands), 1993, Vol. 83, pp. 211-220

Non-Patent Document 2: 205$^{th}$ Electrochemical Society Meeting Abs No. 334

DISCLOSURE OF THE INVENTION

Problems to be Solved by the Invention

An object of the present invention is to provide a fuel cell capable of maintaining excellent bondability and catalytic performance over a long period by improving homogeneity of catalyst layers in electrodes of the fuel cell and bondability between the electrodes and a polymer electrolyte membrane in particular.

Means for Solving the Problems

The inventors have invented a proton-conducting polymer composition containing an aromatic hydrocarbon-based proton-conducting polymer capable of excellently deriving the performance of a fuel cell catalyst when interposed between electrodes of a fuel cell in particular, and the present invention has the following structure:

A proton-conducting polymer composition at least containing an aromatic hydrocarbon-based proton-conducting polymer and a solvent, in which the content of said proton-conducting polymer is in the range of 1 to 30 mass % while a component of the proton-conducting polymer having a molecular weight in the range of 2000 to 23000 in terms of polyethylene glycol accounts for at least 10 mass % of the total amount of the proton-conducting polymer.

In the proton-conducting polymer composition, the molecular weight distribution of the proton-conducting polymer has at least two maximal values, and at least one of the maximal values exhibits a molecular weight in the range of 2000 to 23000 in terms of polyethylene glycol while at least another one of the maximal values exhibits a molecular weight in the range greater than 23000 in terms of polyethylene glycol.

In the proton-conducting polymer composition, the maximal value exhibiting the molecular weight in the range greater than 23000 in terms of polyethylene glycol in the molecular weight distribution of the proton-conducting polymer is in the range of the molecular weight of 50000 to 120000 in terms of polyethylene glycol.

The proton-conducting polymer composition at least contains water in the range of 1 to 45 mass % and an organic solvent in the range of 50 to 98 mass % as the solvent.

In the proton-conducting polymer composition, absorptivity in a visible light absorption spectrum at 750 nm is in the range of 0 to 0.3 $cm^{-1} \cdot \%^{-1}$.

The proton-conducting polymer composition exhibits structural viscosity.

In the proton-conducting polymer composition, the proton-conducting polymer is composed of a sulfonated polyarylene ether-based polymer.

In the proton-conducting polymer composition, the content of sulfonic acid groups in the proton-conducting polymer is in the range of 0.3 to 3.5 meq/g.

The present invention also provides a method for preparing a proton-conducting polymer composition for obtaining the proton-conducting polymer composition, at least having the step of adding a first solvent to the proton-conducting polymer and thereafter further adding a second solvent having a smaller solubility parameter than the first solvent.

In the method for preparing a proton-conducting polymer composition, the first solvent is water, and the second solvent is an organic solvent.

The present invention also provides a catalyst ink having the aforementioned proton-conducting polymer composition and a catalyst.

The present invention also provides a fuel cell into which an electrode-electrolyte membrane assembly formed by stacking electrodes prepared from the aforementioned catalyst ink and a polymer electrolyte membrane composed of the proton-conducting polymer is incorporated.

Effects of the Invention

The proton-conducting polymer composition according to the present invention can be prepared as a catalyst ink capable of forming catalyst layers excellent in homogeneity by being mixed with a catalyst for a fuel cell or the like. Electrodes prepared from this catalyst ink implement excellent catalytic performance and maintain excellent bondability between the same and an electrolyte membrane composed of an aromatic hydrocarbon-based proton-conducting polymer over a long period, whereby a fuel cell excellent in durability can be provided according to the present invention.

BRIEF DESCRIPTION OF THE DRAWINGS

FIG. 1 is a diagram showing the relation between viscosity levels of proton-conducting polymer compositions according to Examples and comparative example and frequencies (shear rates).

BEST MODES FOR CARRYING OUT THE INVENTION

First, the aromatic hydrocarbon-based proton-conducting polymer in the present invention is described. The aromatic hydrocarbon-based proton-conducting polymer in the present invention is a non-fluoric proton-conducting polymer in a structure having an aromatic or an aromatic ring and at least one bond group selected from an ether bond, a sulfone linkage, an imide linkage, an ester linkage, an amide linkage, an urethane linkage, a sulfide linkage, a carbonate linkage and a ketone linkage in a polymeric main chain, and a polymer prepared by introducing at least one ionic group into a polymer containing at least one component such as polysulfone, poly(ethersulfone), polyphenylene oxide, polyphenylene sulfide, polyphenylene sulfide sulfone, polyparaphenylene, polyarylene, polyarylene ether, polyphenyl quinoxaline, polyaryl ketone, polyether ketone, polyether ether ketone, polybenzoxazole, polybenzthiazole or polyimide can be listed. At least one of a sulfonic acid group, a phosphonic acid group, a carboxylic group, a phosphoric acid group and derivatives thereof can be listed as the ionic group. The polymer exhibits proton conductivity due to the functional group such as the sulfonic acid group, the phosphonic acid group, the carboxylic group or the phosphoric acid group contained therein. Among these, the particularly effectively working functional group is the sulfonic acid group. Polysulfone, polyether sulfone, polyether ketone etc. mentioned here are the generic terms for polymers having a sulfone linkage, an ether linkage and a ketone linkage in the molecular chains thereof, include polyether ketone ketone, polyether ether ketone, polyether ether ketone ketone, polyether ketone ether ketone ketone, polyether ketone sulfone etc., and are not limited to specific polymer structures. The polymer may have a branched structure with side chains or the like.

Among the aforementioned polymers containing functional groups, a polymer having a sulfonic acid group on an aromatic ring in particular can be obtained by reacting a proper sulfonation agent with a polymer having the aforementioned exemplary skeleton. Such a sulfonation agent is reported as an example introducing a sulfonic acid group into an aromatic hydrocarbon-based polymer, for example. An agent using concentrated sulfuric acid or fuming sulfuric acid (Solid State Ionics, 106, p. 219 (1998), for example), that using chlorosulfuric acid (J. Polym. Sci., Polym. Chem., 22, p. 295 (1984), for example) or that using a sulfuric anhydride complex (J. Polym. Sci., Polym. Chem., 22, P. 721 (1984) or J. Polym. Sci., Polym. Chem., 23, P. 1231 (1985), for example) is effective. The proton-conducting polymer according to the present invention, particularly a polymer exhibiting proton conductivity with a sulfonic acid group, can be obtained by employing such a reagent and selecting reaction conditions responsive to each polymer. A sulfonation agent described in Japanese Patent No. 2884189 or the like can also be employed.

The aforementioned aromatic hydrocarbon-based proton-conducting polymer can alternatively be synthesized through at least one monomer, employed for polymerization, containing an acidic group. The acidic group may be bonded to either the main chain or a side chain. For example, polyimide synthesized from aromatic diamine and aromatic tetracarboxylic dianhydride can be converted to acidic group-containing polyimide through diamine containing a sulfonic acid group or a phosphonic acid group in at least one type of aromatic diamine. Polybenzoxazole synthesized from aromatic diamine diol and aromatic dicarboxylic acid or polybenzthiazole synthesized from aromatic diamine dithiol and aromatic dicarboxylic acid can be converted to acidic group-containing polybenzoxazole or polybenzthiazole by using sulfonic acid group-containing dicarboxylic acid or phosphonic acid group-containing dicarboxylic acid for at least one type of aromatic dicarboxylic acid. Polysulfone, polyether sulfone or polyether ketone synthesized from aromatic dihalide and aromatic diol can be synthesized by employing sulfonic acid group-containing aromatic dihalide or sulfonic acid group-containing aromatic diol for at least one monomer. It can be said that not sulfonic acid group-containing diol but sulfonic acid group-containing dihalide is preferably employed at this time so that the degree of polymerization can be easily improved and thermal stability of the obtained acidic group-containing polymer is increased. The position of the sulfonic acid group can also be controlled by introducing the sulfonic acid group to the main chain or the side chain depending on the substitutional position of dihalide in a dihalide monomer containing the sulfonic acid group.

The aromatic hydrocarbon-based proton-conducting polymer in the present invention is more preferably a polyarylene ether-based compound such as sulfonic acid group-containing polysulfone, polyether sulfone, polyphenylene oxide, polyphenylene sulfide, polyphenylene sulfide sulfone or polyether ketone-based polymer or a polyarylene-based compound containing a sulfonic acid group.

Among these polyarylene ether-based compounds, a compound containing a component expressed in the following general formula (1) is particularly preferable:

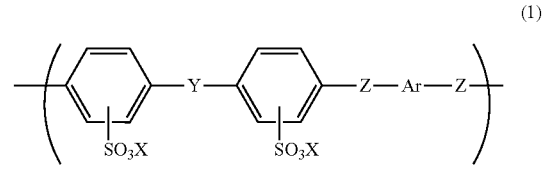

(1)

While Ar is selected from a bivalent aromatic group, Y is selected from a sulfone group or a ketone group, X is selected from H and/or a monovalent cation group and Z is selected from an arbitrary bonding system bonding to an aromatic ring, direct bonding, ether bonding and/or thioether bonding (O or S) is preferable for Z. Further, ether bonding is preferable for Z.

A compound containing a component expressed in the following general formula (2) is more preferable:

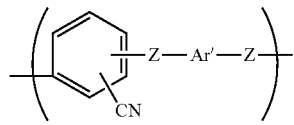
(2)

While Ar' is selected from a bivalent aromatic group and Z is selected from an arbitrary bonding system bonding to an aromatic ring, direct bonding, ether bonding and/or thioether bonding (O or S) is preferable for Z. Further, ether bonding is preferable for Z.

Among these polyarylene ether-based compounds, a compound containing the components expressed in the above general formula (1) as well as the above general formula (2) is particularly preferable.

The component expressed in the above general formula (1) is particularly preferably a component expressed in the following general formula (3):

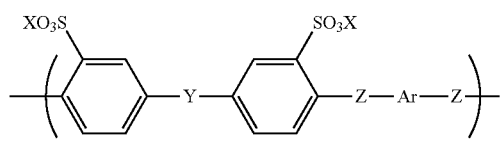
(3)

While Ar is selected from a bivalent aromatic group, Y is selected from a sulfone group or a ketone group, X is selected from H and/or a monovalent cation group and Z is selected from an arbitrary bonding system bonding to an aromatic ring, direct bonding, ether bonding and/or thioether bonding (O or S) is preferable for Z. Further, ether bonding is preferable for Z.

Further, the component expressed in the above general formula (2) is particularly preferably expressed in the following general formula (4):

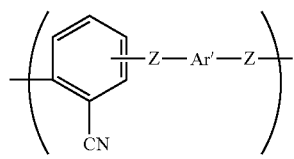
(4)

While Ar' is selected from a bivalent aromatic group and Z is selected from an arbitrary bonding system bonding to an aromatic ring, direct bonding, ether bonding and/or thioether bonding (O or S) is preferable for Z. Further, ether bonding is preferable for Z.

Further, the component expressed in the above general formula (2) is particularly preferably expressed in the following general formula (5):

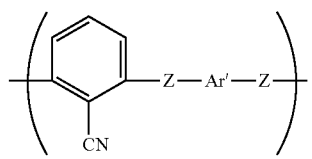
(5)

While Ar' is selected from a bivalent aromatic group and Z is selected from an arbitrary bonding system bonding to an aromatic ring, direct bonding, ether bonding and/or thioether bonding (O or S) is preferable for Z. Further, ether bonding is preferable for Z.

The aforementioned sulfonic acid group-containing polyarylene ether-based compound may contain a structural unit other than those expressed in the above general formulas (1) to (5). At this time, the content of the structural unit other than those expressed in the above general formulas (1) to (5) is preferably not more than 50 mass % of the inventive sulfonic acid-containing polyarylene ether. The composition can make the best use of the sulfonic acid group-containing polyarylene ether-based compound by setting the content to not more than 50 mass %.

The sulfonic acid group content in the aromatic hydrocarbon-based proton-conducting polymer is preferably in the range of 0.3 to 2.8 meq/g. The polymer tends to exhibit insufficient proton conductivity if the content is less than 0.3 meq/g, while the polymer tends to be unsuitable for use due to excessive swelling if the content is greater than 2.8 meq/g. These tendencies are particularly remarkable in a fuel cell using an organic fuel such as methanol. More preferably, the content is in the range of 0.6 to 2.4 meq/g. If the inventive proton-conducting polymer composition has structural viscosity, the sulfonic acid group content in the aromatic hydrocarbon-based proton-conducting polymer is preferably set to the range of 0.3 to 3.5 meq/g, further to the range of 1.0 to 3.0 meq/g. The sulfonic acid group content can be calculated from the composition of the polymer.

The sulfonic acid group-containing polyarylene ether-based compound can be polymerized by aromatic nucleophilic substitutional reaction containing compounds expressed in the following general formulas (6) and (7) as monomers, for example. 3,3'-disulfo-4,4'-dichlorodiphenylsulfone, 3,3'-disulfo-4,4'-difluorodiphenylsulfone, 3,3'-disulfo-4,4'-dichlorodiphenyl ketone, 3,3'-disulfo-4,4'-difluorodiphenylsulfone and substances prepared from these sulfonic acid groups forming salts with monovalent or prevalent cations can be listed as specific examples of the compound expressed in the general formula (6). Monovalent cations may be prepared from sodium, potassium, still another metal species and amine, and are not restricted to these. 2,6-dichlorobenzonitrile, 2,6-difluorobenzonitrile, 2,4-dichlorobenzonitrile, 2,4-difluorobenzonitrile etc. can be listed as examples of the compound expressed in the general formula (7).

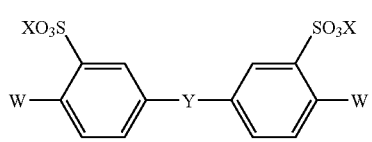
(6)

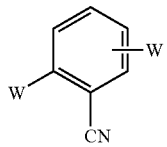

(7)

Y represents a sulfone group or a ketone group, X represents monovalent cation, and W represents chlorine or fluorine.

In the present invention, the aforementioned 2,6-dichlorobenzonitrile and 2,4-dichlorobenzonitrile are isomeric to each other, and either can attain excellent proton conductivity, thermal resistance, workability and dimensional stability. This is considered to be because both monomers are excellent in reactivity and constitute small repetitive units thereby rendering the structures of the overall molecules harder and more stable. The monomers conceivably further stabilize the structures due to polarities.

In the aforementioned aromatic nucleophilic substitutional reaction, various activated difluoroaromatic compounds and dichloroaromatic compounds can also be employed as monomers along with the compounds expressed in the above general formulas (6) and (7). While 4,4'-dichlorodiphenylsulfone, 4,4'-difluorodiphenylsulfone, 4,4'-difluorobenzophenone, 4,4'-dichlorobenzophenone, decafluorobiphenyl etc. can be listed as examples of these compounds, the compounds are not restricted to these but other aromatic dihalogen compounds, aromatic dinitro compounds and aromatic dicyano compounds active to aromatic nucleophilic substitutional reaction can also be employed.

Ar in the components expressed in the above general formulas (1) and (3) and Ar' in the components expressed in the above general formulas (2), (4) and (5) are generally structures introduced from the aromatic diol component monomer used along with the compounds expressed in the above general formulas (6) and (7) in aromatic nucleophilic substitutional polymerization. While 4,4'-biphenol, bis(4-hydroxyphenyl)sulfone, 1,1-bis(4-hydroxyphenyl)ethane, 2,2-bis(4-hydroxyphenyl)propane, bis(4-hydroxyphenyl)methane, 2,2-bis(4-hydroxyphenyl)butane, 3,3-bis(4-hydroxyphenyl)pentane, 2,2-bis(4-hydroxy-3,5-dimethylphenyl)propane, bis(4-hydroxy-3,5-dimethylphenyl)methane, bis(4-hydroxy-2,5-dimethylphenyl)methane, bis(4-hydroxyphenyl)phenylmethane, bis(4-hydroxyphenyl)diphenylmethane, 9,9-bis(4-hydroxphenyl)fluorene, 9,9-bis(3-methyl-4-hydroxyphenyl)fluorene, 2,2-bis(4-hydroxyphenyl)hexafluoropropane, hydroquinone, resorcin, bis(4-hydroxyphenyl)ketone, 1,5-dihydroxynaphthalene, 1,6-dihydroxynaphthalene, 1,7-dihydroxynaphthalene, 2,6-dihydroxynaphthalene, 2,7-dihydroxynaphthalene, 4,4'-thiobisbenzenethiol, 1,4-benzenedithiol, 1,3-benzenedithiol, 4,4'-biphenyldithiol etc. can be listed as examples of such aromatic diol monomers, various aromatic diols employable for polymerization of a polyarylene ether-based compound according to aromatic nucleophilic substitutional reaction can also be employed in addition. While each of these aromatic diols can be singly used, it is also possible to use a plurality of aromatic diols together.

When a sulfonic acid group-containing polyarylene ether-based compound is polymerized by aromatic nucleophilic substitutional reaction, a polymer can be obtained by reacting an activated difluoroaromatic compound containing compounds expressible in the above general formulas (6) and (7) and/or a dichloroaromatic compound and aromatic diol in the presence of a basic compound.

While polymerization can be performed in the temperature range of 0 to 350° C., a temperature of 50 to 250° C. is preferable. Reaction tends to insufficiently progress if the temperature is lower than 0° C., while the polymer tends to start decomposing if the temperature is higher than 350° C. The reaction, which can be caused with no solvent, is preferably caused in a solvent.

While N-methyl-2-pyrrolidone, N,N-dimethylacetamide, N,N-dimethylformamide, dimethylsulfoxide, diphenylsulfone, sulfolane etc. can be listed as examples of a usable solvent, the solvent is not restricted to these but may simply be that usable as a stable solvent in the aromatic nucleophilic substitutional reaction. The organic solvent may be used either singly or as a mixture of at least two solvents. While sodium hydroxide, potassium hydroxide, sodium carbonate, potassium carbonate, sodium hydrogen carbonate, potassium hydrogen carbonate etc. can be listed as examples of the basic compound, a basic compound capable of bringing the aromatic diol into an active phenoxide structure can be used without restriction to these examples.

In the aromatic nucleophilic substitutional reaction, water may be formed as a byproduct. In this case, the water can be removed from the system as an azeotrope by making toluene or the like coexist in the reaction system regardless of the polymerization solvent. In relation to a method of removing the water from the system, a water absorber such as a molecular sieve can also be used.

When the aromatic nucleophilic substitutional reaction is caused in a solvent, the molecular weight of the obtained polymer can be adjusted by controlling the reaction temperature, the polymer concentration, the reaction time etc. The reaction temperature is particularly preferably in the range of 50° C. to 250° C. as described above, to attain excellent productivity since the increasing rate of the molecular weight tends to quicken as the temperature increases. As to the polymer concentration, the monomer is preferably so charged that the monomer concentration is in the range of 2 to 50 mass %, further in the range of 5 to 50 mass %. If the concentration is smaller than 2 mass %, the molecular weight tends to hardly increase. If the concentration is larger than 50 mass %, on the other hand, viscosity of the reaction system tends to so excessively increase that it is difficult to post-treat the reactant. The reaction time is 0.2 hours to 500 hours, preferable 1 to 80 hours. It tends to be difficult to attain homogeneous reaction if the reaction time is shorter than 0.2 hours since the temperature of the system is not constant, while it is not preferable that the reaction time exceeds 500 hours in view of productivity. The molecular weight tends to increase as the reaction time lengthens.

As a method of controlling the molecular weight, it is also possible to suppress excessive progress of polymerization by sealing an end of the polymer. While a method of adding a monomer having one reactive site can be listed, for example, the method is not particularly restricted.

The proton-conducting polymer in the proton-conducting polymer composition according to the present invention contains a component having a molecular weight in the range of 2000 to 23000 in terms of polyethylene glycol. While no detailed reason has been recognized, it is possible to maintain a high voltage in a low current density region easily causing a voltage drop due to catalytic activity in fuel cell power generation when electrodes prepared from a catalyst ink obtained by mixing/adjusting a composition containing an aromatic hydrocarbon-based proton-conducting polymer having a molecular included in this range and a catalyst for a fuel cell are applied to a fuel cell. The state of adsorption of the aromatic hydrocarbon-based proton-conducting polymer to the catalyst is supposedly concerned. A component having a molecular weight smaller than 2000 in terms of polyethylene glycol tends to be not stably usable due to solubility in water or the like, while a component having a molecular weight larger than 23000 in terms of polyethylene glycol tends to less contribute to voltage drop suppression in the low current density region and cause a voltage drop. More preferably, the proton-conducting polymer preferably contains a component having a molecular weight in the range of 2500 to 23000 in terms of polyethylene glycol, more preferably in the range of 3000 to 20000, further preferably in the range of 3000 to 15000. In the present invention, it is necessary that the component having the molecular weight in the range of 2000 to 23000 in terms of polyethylene glycol accounts for at least 10 mass %, more preferably 15 to 100 mass %, further preferably 20 to 100 mass % of the total amount of the aromatic hydrocarbon-based proton-conducting polymer. If the content of the aforementioned component is smaller than 10 mass %, the effect of voltage drop suppression tends to be canceled due to influence by a component having a larger molecular weight.

The molecular weight in polymerization of the proton-conducting polymer has a molecular weight distribution represented by normal distribution, and hence the maximal value of the molecular weight distribution tends to be relatively small when the aromatic hydrocarbon-based proton-conducting polymer containing at least 10 mass % of the component having the molecular weight of 2000 to 23000 in terms of polyethylene glycol is obtained by polymerization reaction. If the molecular weight is small, chemical/physical stability so lowers that physical/chemical stability of the electrodes tends to lower to some extent when the proton-conducting polymer is applied to a fuel cell. Further, this tendency easily causes a larger problem than a fluoric proton-conducting polymer due to essential chemical stability. Also when the catalytic performance can be sufficiently derived by reducing the molecular weight, therefore, durability tends to easily lower if power generation conditions are so severe that the temperature of the fuel cell increases. As the composition containing the aromatic hydrocarbon-based proton-conducting polymer, therefore, a mixed composition containing an aromatic hydrocarbon-based proton-conducting polymer having at least one maximal value of a molecular weight distribution in such a range that the molecular weight is larger than 23000 in terms of polyethylene glycol in addition to an aromatic hydrocarbon-based proton-conducting polymer component at least having the maximal value of a molecular weight distribution in the range of the molecular weight of 2000 to 23000 in terms of polyethylene glycol is preferable, and chemical/physical stability can be improved in this case. More preferably, catalytic performance and durability can be rendered compatible with each other when the composition contains a component having the maximal value of the molecular weight in the range of 50000 to 120000 in terms of polyethylene glycol along with the proton-conducting polymer component having the maximal value of the molecular weight in the range of 2000 to 23000 in terms of polyethylene glycol. Further preferably, the maximal value of the molecular weight of the component having the larger maximal value of the molecular weight is in the range of 60000 to 90000. If the maximal value of the molecular weight in terms of polyethylene glycol exceeds 120000, the composition tends to be unpreferable in handling due to increased viscosity. A method of preparing such a polymer composition having a plurality of maximal values of molecular weights is not particularly restricted but a well-known method can be employed. A method simply mixing proton-conducting polymers having different molecular weight distributions at an arbitrary ratio is convenient.

As to the type of the organic solvent usable in the proton-conducting polymer composition according to the present invention, it is preferable to select a polar organic solvent selected from alcohols, ethers, ketones, nitriles etc (excluding an impurity contained in a small amount). It tends to be more preferable to use a solvent containing water in addition to the organic solvent selected from alcohols, ethers and ketones. Solubility or dispersibility of the proton-conducting polymer in the composition tends to improve due to the contained water. Further, the water reduces dangerousness such as a fire when the solvent is mixed with a catalyst.

Alcohol, ether or ketone usable as a more preferable solvent is preferably constituted of that having a carbon number of not more than 6 in consideration of poisonous influence on the catalyst and handleability as a catalyst ink, and methanol, ethanol, propanol, butanol, pentanol, hexanol, 2-methoxyethanol, 2-ethoxyethanol, 2-methyl-1-propanol, 3-methyl-1-butanol, 1-ethoxy-2-propanol, 3-methoxybutanol or the like is a preferably usable example as an alcoholic solvent. As an ether type solvent, diethylether, ethyl methyl ether, ethylene glycol dimethylether, diethylene glycol monomethylether, methylal, 1,4-dioxane or the like is a preferably usable example. As a ketone type solvent, acetone, diethyl ketone, cyclohexanone, cyclopentanone, 2-hexanone, 4-methyl-2-pentanone, 2-heptanone or the like is a selectable example. Further, acetonitrile or the like can be listed as a nitrile-based solvent. These can also be combined with each other. In particular, an organic solvent selected from ketones or ethers or employment of ketones or ethers and alcohols leads to such a tendency that the composition is easy to handle also when the concentration of the proton-conducting polymer is high, and a solvent containing water along with these solvents can be further excellently handled.

As a method of substituting the solvent in polymerization with another solvent, a method of obtaining a solid proton-conducting polymer and thereafter dissolving/dispersing the same in a solvent suitable for the composition according to the present invention can be employed. As a method of removing the solvent in polymerization, there is a method of removing the solvent from a reactive solution by evaporation after completion of polymerization reaction and washing the residue if necessary. Alternatively, a polymer can be obtained by adding the reactive solution into a solvent having low solubility for the proton-conducting polymer thereby precipitating the polymer as a solid and filtering out the precipitate. The latter method, capable of removing the solvent by dissolving salt formed in polymerization reaction in water when precipitating the polymer in water, for example, is an excellent method for purifying the proton-conducting polymer. The residue can be removed by filtration in place of washing.

The obtained aromatic hydrocarbon-based proton-conducting polymer can be dissolved/dispersed in a polymeric solvent or a mixed solution composed of another organic solvent in the form of salt such as sulfonate, for example, or can also be dissolved/dispersed in an arbitrary solvent after the polymer is treated in an acidic solvent such as a sulfuric acid solution or a chloric acid solution and washed to be converted to an acidic form. When converted to the acidic form, the polymer, generally treated with an excess amount of acid, may contain excess acid. Therefore, the excess acidic constituent is preferably removed by repeating washing or the like after conversion to the acidic form. At this time, an acidic functional group may be converted to a salt type if water employed for washing contains salt, and hence water such as ion-exchanged water subjected to deionization is preferably used.

The ratio of water in the proton-conducting polymer composition according to the present invention is preferably in the range of 1 to 45 mass %, and in order to further improve the handleability of the composition, it is preferred that the water content is in the range of 1 to 40 mass %, more preferably in the range of 1 to 20 mass %, further preferably in the range of 2 to 15 mass %. If the water content accounting for the mixed solvent is large and exceeds 45 mass %, the viscosity of the composition tends to be so high that the composition is hard to handle in a case of obtaining a composition containing a high-concentration proton-conducting polymer in particular. If the ratio of water is less than 1 mass %, on the other hand, the proton-conducting polymer remains in a solid state and hence it tends to be difficult to obtain a homogeneous composition and this may cause a problem at a time of obtaining a dispersion of the proton-conducting polymer having a relatively high concentration.

From the viewpoint of controlling the viscosity of the composition, it is also preferable that the ratio of water accounting for the composition is in the range of 10 to 40 mass % (residue: organic solvent), and the water content is preferably in the range of 10 to 30 mass %, in order to further improve the handleability of the composition. If the water content accounting for the mixed solvent is large and exceeds 40 mass % at this time, the proton-conducting polymer tends to be hardly dissolved/dispersed in the composition. Also when the proton-conducting polymer is dissolved/dispersed in the composition, the viscosity of the composition tends to be so remarkably high that the composition may be hard to handle. If the water content is less than 10 mass %, on the other hand, the composition tends to be unpreferable in safety since the same easily ignites when mixed with a catalyst for preparing a catalyst ink.

It is preferred that the ratio of the organic solvent accounting for the mixed solvent of water and the organic solvent is in the range of 50 to 98 mass %. If the ratio of the organic solvent is less than 50 mass %, the viscosity of the composition is so high that the composition is hard to handle and tends to gelate in particular. If the ratio of the organic solvent exceeds 98 mass %, on the other hand, the concentration of the proton-conducting polymer so lowers that the proton-conducting polymer may be ineffective in preparation of a catalyst ink. More preferably, the ratio is in the range of 60 to 95 mass %.

The concentration of the proton-conducting polymer in the proton-conducting polymer composition according to the present invention is preferably in the range of 1 to 30 mass %. The amount of the polymer accounting for the composition is so small that the polymer may be ineffective in preparation of a catalyst ink if the concentration of the proton-conducting polymer is less than 1 mass %, while the proton-conducting polymer tends to be hardly dissolved and dispersed in the proton-conducting polymer composition or the viscosity tends to be so high that the proton-conducting polymer composition is hard to handle also when the same is dissolved and dispersed if the concentration exceeds 30 mass % to the contrary. The composition can be particularly excellently handled when the concentration of the proton-conducting polymer is in the range of 1 to 25 mass %, and the concentration is more preferably in the range of 2 to 20 mass %, further preferably in the range of 3 to 15 mass %. If the concentration is in the range of 5 to 20% in a proton-conducting polymer composition having structural viscosity, it is preferable in a point that handling of the composition is excellent.

In the proton-conducting polymer composition according to the present invention, the aromatic hydrocarbon-based proton-conducting polymer in the composition is conceivably in a state of dissolution (homogeneously spreading state) or dispersion (part containing the polymer and part constituted of only the solvent are separately present), or in an intermediate state therebetween. The structure in the composition conceivably varies with the combination of the types or amounts of water and the organic solvent. Considering behavior in dissolution/dispersion in the mixed solvent, dissolution/dispersion is prompted by a method swelling the aromatic hydrocarbon-based proton-conducting polymer with water and thereafter adding the organic solvent, and hence it is supposed that the aromatic hydrocarbon-based proton-conducting polymer has a micellar structure swollen with water when the same is in the structure dispersed in the mixed solvent such that micelles thereof are dispersed in the organic solvent. Further, it is supposed that the polymer approaches the state of dissolution as the compatibility between the organic solvent and the polymer/water increases due to the characteristics of the organic solvent.

As to the composition according to the present invention, it tends to be more preferable to homogeneously dissolve/disperse the polymer to reach a state having no separation such as precipitation. As a method therefor, a method adding a previously prepared mixed solution of water and one type of organic solvent with each other or a method adding water or the like, for example, as a first solvent having a relatively large solubility parameter to the proton-conducting polymer for temporarily swelling the same, thereafter adding an organic solvent or the like as a second solvent having a smaller solubility parameter than the first solvent, mixing the same by a physical method represented by stirring or the like and heating the mixture can be employed. When the polymer is homogenized by the former method, a longer time is required as compared with the preparation method according to the present invention and this is undesirable in consideration of productivity. Further, the polymer may remain in an unsolved state. Hence, the latter is superior in the point of easiness of adjusting the composition. If the content of water is small in particular in preparation of the composition according to the present invention, the amount of water is so small as compared with the amount of the polymer that the polymer only partially contains water, and hence the time required for homogenization tends to be long when the composition is prepared by subsequently adding the organic solvent. Therefore, a method adding the organic solvent after spreading water as homogenous as possible is preferable. This tendency becomes remarkable as the amount of the polymer increases. It is effective to employ a physical method such as stirring as the method of homogeneously spreading the water, and it is also effective to employ a thermal method such as heating. Alternatively, the polymer can be stood still under arbitrary environment, for waiting for the water to naturally spread. These methods may be combined with each other.

As to the aromatic hydrocarbon-based polymer used in preparation of the composition according to the present invention, a polymer such as that in the form of fine powder having a large apparent surface area can be superiorly handled as compared with a large blocky polymer since the solvent can be easily spread. In water used as the solvent or an organic solvent, it is necessary to pay attention to the purity so that no impurity poisoning the catalyst is contained. There is also such a possibility that the solvent used in polymerization of the polymer remains in the polymer. The solvent is preferably removed to the minimum since the solvent employed in polymerization may exert bad influence on the performance of the fuel cell. While the solvent is optimally preferably removed up to 0 mass % or so with respect to the mass of the polymer, removal up to not more than 5 mass %, or not more than 1 mass % is preferable. Such a result is also recognized that, when a composition is prepared not by dispersing a proton-conducting polymer in a mixed solution of water and an organic solvent but by dissolving the same in a polymeric solvent and used for preparing electrodes of a fuel cell, the performance lowers as compared with a case of employing electrodes prepared from the composition according to the present invention.

Further, the inventors have conducted a study for obtaining better power output, to find out that particularly excellent fuel cell performance is obtained in a composition containing a proton-conducting polymer having a molecular weight included in the range of 2000 to 23000, particularly 2500 to 23000 in terms of polyethylene glycol when absorptivity of the composition in a visible light absorption spectrum at 750 nm is in the range of 0 to 0.3 $cm^{-1}\%^{-1}$. A fuel cell prepared from a composition having absorption coefficient larger than 0.3 $cm^{-1}\%^{-1}$ tends to exhibit such a large voltage drop in a high current density region that no excellent performance is obtained. More preferably, the absorption coefficient is in the range of 0 to 0.15 $cm^{-1}\%^{-1}$, and further preferably in the range of 0.0001 to 0.05 $cm^{-1}\%^{-1}$. Inferring from that a voltage drop at a high current density is generally regarded as diffusion-controlled reaction of the fuel or oxygen, it is supposed that the electrodes tend to be densely packed when a composition having absorption coefficient exceeding 0.3 $cm^{-1}\%^{-1}$ is employed. However, the fuel cell can exhibit excellent power output in a low current density region also in this case.

The proton-conducting polymer composition according to the present invention preferably exhibits structural viscosity, i.e., such a phenomenon that viscosity remarkably lowers upon application of shearing force. In order to supply the proton-conducting polymer composition with structural viscosity, it is particularly important to select the water content and the type of the organic solvent at a proper composition ratio. When the proton-conducting polymer composition having structural viscosity is used as a catalyst ink, the catalyst ink has low viscosity and excellent fluidity in a stage of forming a catalyst layer by coating with a doctor blade, for example, due to application of shearing force, while the fluidity lowers in a stage where no more shearing force is applied and hence it is possible to reduce the possibility for such a problem that the catalyst ink once coated flows down. Consequently, a catalyst layer superior in homogeneity can be formed. In a still state, the catalyst ink has such a merit that the same can be preserved in a state where the catalyst is excellently dispersed due to the high viscosity of the catalyst ink. The viscosity of the proton-conducting polymer composition in a static state is preferably at least 1 Pa·s. If the viscosity is less than 1 Pa·s, it tends to be difficult to make the best use of the characteristics of the composition exhibiting structural viscosity since the viscosity is essentially low. The proton-conducting polymer composition exhibiting structural viscosity defined in the present invention is such a proton-conducting polymer composition that the viscosity at a frequency 40 (1/sec) is not more than ⅓, more preferably not more than ⅕ of the viscosity at a frequency 2 (1/sec) when the frequency in measurement with an E-type viscometer is varied from 2 (1/sec) to 40 (1/sec).

The proton-conducting polymer composition according to the present invention may contain an antioxidant, so that durability can be improved in formation of a fuel cell in this case. While the type and the amount of the antioxidant are not particularly restricted, an antioxidant including an aromatic structure in molecules, such as a hindered phenol-based antioxidant or a hindered amine-based antioxidant, for example, can be excellently used in view of affinity to the polymer. It is particularly excellent to mix the antioxidant into the proton-conducting polymer in the range of 0.01 to 10 mass %, while the effect of preventing oxidation is small if the ratio is less than 0.01 mass % and the ratio of the antioxidant to the polymer so increases if the ratio exceeds 10 mass % that cracking may easily take place in preparation of electrodes for a fuel cell. An antioxidant described in Japanese Patent Laying-Open No. 2003-201403 or the like can also be listed as an exemplary antioxidant. The proton-conducting polymer composition according to the present invention may contain various additives such as a thermal stabilizer, a crosslinking agent, an antistatic agent, a defoaming agent, a polymerization inhibitor, an inorganic compound of silica particles, alumina particles, titania particles or phosphotungstic acid particles, a hybrid inorganic-organic compound, an ionic liquid etc. in addition to the antioxidant, if necessary.

A catalyst ink used for preparing electrodes of a fuel cell can be prepared from the proton-conducting polymer composition according to the present invention. The method of preparing the catalyst ink is not particularly restricted but a well-known technique can be used. While a catalyst used for the catalyst ink can be properly selected in view of oxidation resistance and catalytic activity, a platinum group metal or an alloy or an oxide thereof is particularly preferable. For example, employment of a platinum or a platinum alloy is suitable for high-efficiency power generation in a case of considering application to a cathode while employment of platinum, a platinum alloy or an alloy of platinum and ruthenium is suitable in a case of considering application to an anode. It is preferable to employ catalytic particulates carried by granular or fibrous carbon such as activated carbon or graphite. The catalytic particulates can be excellently used also when carried by a nanocarbon material such as a carbon nanotube or a carbon nanohorn. The catalyst ink can be prepared by mixing the catalyst properly selected in this manner and the composition according to the present invention with each other. At this time, it is also possible to prepare the catalyst ink by preparing an ink mixture from the catalyst and the composition, thereafter temporarily preparing such catalyst particles that the proton-conducting polymer covers the surface of the catalyst by scattering the solvent and thereafter dissolving the particles in the solvent again. If the amount of water accounting for the composition is particularly small, the composition may ignite depending on the type of the catalyst, and hence it is also effective to previously introduce a small amount of water into the catalyst and thereafter add the composition according to the present invention. Cooling is also effective. The catalyst ink may further contain a component other than the catalyst and the composition according to the present invention.

An electrode-electrolyte membrane assembly can be prepared by forming catalyst layers (electrodes) obtained by developing/drying the catalyst ink prepared in the aforementioned manner on a proton-conducting electrolyte membrane. At this time, gas diffusion layers constituted of porous carbon nonwoven fabric or carbon paper having a role of effectively transporting collectors and a fuel are preferably present on the outer sides of the catalyst layers. While the catalyst layers and the gas diffusion layers may be combinedly referred to as electrodes, the electrodes in the present invention have a structure including catalyst layers, and include both of the catalyst layers themselves and combinations of the catalyst layers and the gas diffusion layers. The gas diffusion layers are not particularly restricted but well-known ones are employable. As to the type of the electrolyte membrane, an electrolyte membrane having the structure shown through the aromatic hydrocarbon-based proton-conducting polymer in the present invention, i.e., an electrolyte membrane prepared from a proton-conducting polymer having an aromatic or an aromatic ring is preferable. If a fluoric proton electrolyte membrane is used, the interfaces between the electrodes and the electrolyte membrane easily separate due to the difference between the characteristics. The electrodes prepared from the composition according to the present invention are excellent in such points that the same can excellently derive catalytic performance and have excellent adhesiveness to a noted proton-conducting polymer electrolyte membrane having an aromatic or an aromatic ring. As to the electrode-electrolyte membrane assembly, it is important to cause no large resistance between the film and the electrodes, and it is also important to cause no separation or flaking of the electrode catalyst by mechanical force.

In order to prepare this assembly, a method homogeneously applying the catalyst ink according to the present invention onto carbon paper, drying the same and thereafter thermally bonding the same to the electrolyte membrane or a method forming catalyst layers on various films in place of carbon paper, thereafter thermally transferring the same to the electrolyte membrane and further superposing the same with porous carbon layers can be employed, for example. When thermal bonding or thermal transfer is performed under a condition controlling the water content in the electrolyte membrane and/or the electrode layers, a superior electrode-electrolyte membrane assembly can be obtained. A method properly adding a hydrophobic material or a foaming agent into the catalyst layers or forming the catalyst layers on the electrolyte membrane and thereafter rendering the surfaces hydrophobic thereby improving gas dispersibility of the catalyst layers is also one of methods for preparing an excellent electrode-electrolyte membrane assembly.

As a method of forming catalyst layers with a proton-conducting polymer composition having structural viscosity, a method thermally transferring films coated with a catalyst ink and dried to an electrolyte membrane can be listed. When the catalyst ink according to the present invention is employed at this time, excellent ink layers can be prepared from the catalyst ink exhibiting high fluidity in a step of coating the films with the catalyst ink. After the coating step, further, the catalyst ink hardly flows due to increased viscosity, whereby forms at the time of coating can be so easily maintained that the catalyst layers can be excellent in homogeneity. The catalyst layers, considerably smooth in thermal transfer, can be formed on the electrolyte membrane in superior forms. Also when the catalyst ink is directly applied onto the electrolyte membrane, catalyst layers excellent in homogeneity can be formed with the catalyst ink excellent in fluidity in application and reduced in fluidity after application. Also when the catalyst layers are formed by a method such as spraying or ink jet printing, further, the catalyst ink, excellent in dispersibility in a still state and increased in fluidity in a nozzle portion, can be excellently used without blocking the nozzle. Further, catalyst layers once formed by spraying can be excellent in homogeneity since the ink hardly flows.

As to the type of the electrolyte membrane, a particularly excellent electrode-electrolyte membrane assembly can be obtained by bonding electrodes to an electrolyte membrane prepared from a proton-conducting polymer having the structure expressed in relation to the aromatic hydrocarbon-based proton-conducting polymer according to the present invention, i.e., such a polymer that the main chain thereof has only an aromatic or an aromatic ring and at least one bond group selected from an ether bond, a sulfone bond, an imide bond, an ester bond, an amide bond, an urethane bond, a sulfide bond, a carbonate bond and a ketone bond. If a fluoric proton electrolyte membrane is used, the interfaces between the electrodes and the electrolyte membrane easily separate due to the difference between the characteristics. Electrodes prepared from the proton-conducting polymer composition according to the present invention are particularly excellent in points exerting no bad influence on the performance of the fuel cell and having excellent adhesiveness to the aforementioned proton-conducting membrane having an aromatic or an aromatic ring. The excellent homogeneity of the catalyst layers also acts as an element improving bondability. As to the electrode-electrolyte membrane assembly, it is important to cause no large resistance between the membrane and the electrodes, and it is also important to cause no separation or flaking of the electrode catalyst by mechanical force. When the electrodes and the electrolyte membrane are bonded to each other by thermal bonding or thermal transfer, a superior electrode-electrolyte membrane assembly can be obtained by controlling the water content in the electrolyte membrane and/or the electrodes. A method properly adding a hydrophobic material or a foaming agent into the catalyst layers or forming the catalyst layers on the electrolyte membrane and thereafter rendering the surfaces hydrophobic thereby improving gas dispersibility in the catalyst layers is also one of methods for preparing an excellent electrode-electrolyte membrane assembly. The thermal bonding or thermal transfer is not particularly restricted in temperature condition, but can be performed in the temperature range of 110 to 250° C., for example. The range of 120 to 200° C. is particularly preferable. It is also possible to prepare a fuel cell with the electrode-electrolyte membrane assembly according to the present invention, and the prepared fuel cell is particularly excellent in a point keeping excellent performance and bondability over a long period.

EXAMPLES

While the present invention is specifically described with reference to Examples, the present invention is not restricted to these Examples.

Examples 1A to 3A and Comparative Examples 1A to 3A

Various measurements were conducted as follows:

<Ion Exchange Capacity (Acidic) of Proton-Conducting Polymer>

As to ion exchange capacity (IEC), the amount of acidic functional groups present in each proton-conducting polymer was measured. As sample preparation, polymer powder was dried in an oven of 80° C. under a nitrogen flow for 2 hours, stood to cool in a desiccator filled with silica gel for 30 minutes, and thereafter subjected to measurement of the dry mass (Ws). Then, 200 ml of 1 mol/l sodium chloride ultra pure aqueous solution and the aforementioned weighed sample were introduced into a closed glass bottle of 200 ml, and stirred at the room temperature for 24 hours in the closed state. Then, the mixture was filtrated through a glass filter. 30 ml of the filtrate was taken out and subjected to neutralization titration with 10 mM of aqueous sodium hydroxide (commercially available standard solution), for obtaining IEC from the titer (T) as follows:

$$IEC(\text{meq/g}) = 10\ T/(30\ Ws) \times 0.2$$

(unit of T: ml, unit of Ws: g)

<Method of Measuring Molecular Weight in Terms of Polyethylene Glycol>

The molecular weight of each proton-conducting polymer was measured as the molecular weight in terms of polyethylene glycol through GPC. Shodex GPC SYSTEM-21 was employed as the measuring apparatus. A column was prepared by connecting a TSKgel G2000H$_{XL}$ column by TOSOH to two TSKgel GMXxL columns by TOSOH. A solvent prepared by dissolving 30 mM of LiBr and 60 mM of phosphoric acid in N,N-dimethylformamide was employed at a temperature of 40° C. and a flow rate of 0.7 ml/min. An RI detector was employed as a detector. The molecular weight was calculated in terms of standard polyethylene glycol. Each sample was dissolved in the solvent to be 0.05 mass % in terms of polymer solid, and thereafter injected by 20 μl.

<Measurement of Visible Absorption Spectrum>

Absorbance (E) with respect to visible light of 750 nm was measured with a double beam spectrophotometer HITACHI U-2001 according to "General Rules for Absorption Spectrophotometry" JIS K0115 (2004). A mixture of only a solvent containing no proton-conducting polymer was employed as control. An iodine tungsten lamp was employed as a light source. The absorbance (E) is obtained as follows:

$E=\log(Io/It)$ (Io: intensity of incident light, It: intensity of transmitted light)

Then, absorption coefficient ($\epsilon[cm^{-1}\%^{-1}]$) was calculated as follows:

Absorption coefficient ($\epsilon$)=$E$(absorbance)/[1(cell length)·$C$(polymer concentration: %)]

<Logarithmic Viscosity of Proton-Conducting Polymer Composition>

Proton-conducting polymer powder was dissolved in N-methylpyrrolidone in a concentration of 0.5 g/dl, subjected to viscosity measurement with an Ubbelohde viscometer in a thermostat of 30° C. and evaluated through logarithmic viscosity ln [ta/tb]/c (ta: drop time (sec.) of sample solution, tb: drop time (sec.) of only solvent, c: polymer concentration).

<Power Generability>

Each electrode-electrolyte membrane assembly was incorporated into a self-made fuel cell evaluation cell and aged by generating power for 5 hours with a fuel cell evaluator of NF Corporation while supplying a fuel of 5 mol/l of methanol solution (prepared from reagent methanol and ultra pure water) and air to an anode and a cathode respectively at a cell temperature of 40° C. Then, initial performance was evaluated by measuring an open circuit voltage (V), a voltage (V) upon a constant current discharge test at 100 mA/cm$^2$ and resistance (mΩ·cm$^2$) obtained by a current interrupting method. Further, a constant current continuous discharge test was conducted at 100 mA cm$^2$ for 300 hours, for checking aged deterioration of the resistance (mΩ·cm$^2$) by a current interrupting method. Increases of resistance values in electrodes and an electrolyte membrane assembly indicate reduction in bondability between the electrodes and the electrolyte membrane. The bonding state was confirmed also from the appearance after power generation.

Example 1A (Preparation of Proton-Conducting Polymer)

12 g of a mixture containing 3,3'-disulfo-4,4'-dichlorodiphenylsulfone disodium salt (abbreviation: S-DCDPS), 2,6-dichlorobenzonitrile (abbreviation: DCBN), 4,4'-biphenol and potassium carbonate at the molar ratios 1.00:1.29:2.29:2.47 was weighed out in a four neck flask of 100 ml along with 2.85 g of a molecular sieve and fed with nitrogen. 50 ml of NMP was introduced into the flask and the mixture was stirred at 150° C. for 2 hours, and the reaction temperature was thereafter increased to 195° C. for continuing reaction with such a measure that the viscosity of the system sufficiently increased (about 6 hours). After standing to cool, the precipitating molecular sieve was removed and the residue was sedimented in water in a stranded manner. An operation of washing the obtained polymer in boiling water for 1 hour was repeated twice. Then, the polymer was dipped in 1 liter of aqueous hydrochloric acid of 1 mol/liter over one night with stirring, thereafter the operation of washing the same in boiling water for 1 hour was repeated twice again and the polymer was thereafter dried under reduced pressure, for obtaining a polymer A1 as an aromatic hydrocarbon-based proton-conducting polymer. Table 1 shows the ion exchange capacity, the logarithmic viscosity, the weight-average molecular weight and the ratio of a component having a molecular weight of 2000 to 23000 in polymer A1.

TABLE 1

| | Ion Exchange Capacity (meq/g) | Logarithmic Viscosity (dl/g) | Weight-Average Molecular Weight | Ratio of Component Having Molecular Weight of 2000 to 23000 (mass %) |
|---|---|---|---|---|
| Polymer A1 | 1.98 | 0.54 | 36800 | 18 |

(Preparation of Proton-Conducting Polymer Composition)

Then, 4.94 g of ion-exchanged water was added to 2 g of the aforementioned proton-conducting polymer in a dry state, and the mixture was stirred for 5 minutes with a hybrid mixer (Keyence) for homogenously spreading water. Then, 33.06 g of isopropanol was added. Further, the mixture was stirred in a water bath of 60° C. to be homogeneous, thereby obtaining a composition A1 as a proton-conducting polymer composition according to Example 1A. The content of the proton-conducting polymer in composition A1 is 5 mass %. The ratio of water accounting for the mixed solvent of water and the organic solvent is 13 mass %. Table 2 shows the solvent composition in composition A1 and absorption coefficient at 750 nm.

(Preparation of Catalyst Ink)

Composition A1 was added to a commercially available 40% platinum carbon catalyst or a 54% platinum/ruthenium carbon catalyst (Tanaka Kikinzoku Kogyo Kabushiki Kaisha) and stirred to be homogeneous, thereby obtaining a catalyst ink for a fuel cell. The catalyst-carrying carbon and the proton-conducting polymer contained in composition A1 were so adjusted that the mass ratio therebetween was 1:0.31.

(Preparation of Electrode)

The catalyst inks were applied onto commercially available carbon papers (E-Tek) with a doctor blade and thereafter dried, thereby preparing electrodes for a fuel cell. At this time, an anode was prepared from the catalyst ink containing the platinum/ruthenium carbon catalyst, and a cathode was prepared from the catalyst ink containing the platinum carbon catalyst. Further, the carbon paper for the anode was formed by a hydrophilic carbon paper, and the carbon paper for the cathode was formed by a carbon paper rendered hydrophobic.

(Preparation of Electrolyte Member)

The aforementioned proton-conducting polymer was dissolved in NMP (27 mass %) and cast on a glass plate provided on a hot plate by casting, NMP was distilled away until the mixture was filmy, and the film was thereafter dipped in water over one night. Further, an operation of washing the film with ultra pure water for 1 hour was repeated five times. Thereafter the film was framed and dried at the room temperature, thereby obtaining a non-fluoric proton-conducting electrolyte membrane.

(Preparation of Electrode-Electrolyte Membrane Assembly)

The aforementioned electrolyte membrane was left under an atmosphere of 20° C. having humidity of 65 RH% to be equibrated with moisture, and thereafter held between the aforementioned two types of electrodes (anode and cathode) under the same environment so that surfaces of catalyst layers were in contact with the electrolyte membrane. This laminate of the electrodes and the electrolyte membrane was held between two stainless plates along with a gasket. Then, the laminate was hot-pressed at 130° C. under pressure, so that the electrodes and the electrolyte membrane were bonded to each other. The laminate was taken out in the state held between the stainless plates and naturally cooled to the room temperature, thereby obtaining an electrode-electrolyte membrane assembly.

Example 2A 11.0 g of ion-exchanged water was added to 2.0 g of the proton-conducting polymer according to Example 1A in a dry state, and the mixture was stirred in a hybrid mixer (Keyence) for 5 minutes for homogeneously spreading moisture. Then, 27.0 g of isopropanol was added. The mixture was stirred at 60° C., thereby obtaining a composition B1 as a proton-conducting polymer composition according to Example 2A. The content of the proton-conducting polymer in composition B1 is 5 mass %. The ratio of water accounting for the mixed solvent of water and the organic solvent is 29 mass %. Table 2 shows the solvent composition in composition B1 and absorbance at 750 nm. Electrodes, an electrolyte membrane and an electrode-electrolyte membrane assembly were prepared with the obtained composition B2 similarly to Example 1A.

Example 3A 3.0 g of ion-exchanged water was added to 2.0 g of the proton-conducting polymer according to Example 1A in a dry state, and the mixture was stirred in a hybrid mixer (Keyence) for 5 minutes for homogeneously spreading water. Then, 3.0 g of ethylene glycol dimethylether and 12.0 g of isopropanol were added. The mixture was stirred at 60° C., thereby obtaining a composition C1 as a proton-conducting polymer composition according to Example 3A. The content of the proton-conducting polymer in composition C1 is 10 mass %. The ratio of water accounting for the mixed solvent of water and the organic solvents is 16.7 mass %. Table 2 shows the solvent composition in composition C1 and absorbance at 750 nm. Electrodes, an electrolyte membrane and an electrode-electrolyte membrane assembly were prepared with the obtained composition C1 similarly to Example 1A.

Comparative Example 1A (Preparation of Proton-Conducting Polymer Composition)

2.54 g of ion-exchanged water was added to 2 g of the proton-conducting polymer according to Example 1A in a dry state, and the mixture was stirred in a hybrid mixer (Keyence) for 5 minutes for homogeneously spreading water. Then, 35.46 g of isopropanol was added. The mixture was stirred at 60° C., thereby obtaining a composition D1 as a proton-conducting polymer composition according to comparative example 1A. The content of the proton-conducting polymer in composition D1 is 5 mass %. The ratio of water accounting for the mixed solvent of water and the organic solvent is 6.7 mass %. Table 2 shows the solvent composition in composition D1 and absorbance at 750 nm.

(Preparation of Electrodes)

Electrodes according to comparative example 1A were prepared with composition D1 according to comparative example 1A by a similar method to Example 1A. In the obtained electrodes, catalyst layers were conspicuously uneven as compared with the electrodes according to Example 1A. Composition D1 exhibited low viscosity in the state of a catalyst ink and the catalyst partially precipitated, and hence there is such a possibility that the amounts of application of the catalyst were partially different from each other. The catalyst ink exhibited high fluidity also after application, conceivably leading to the unevenness of the catalyst layers.

(Preparation of Electrode-Electrolyte Membrane Assembly)

An electrode-electrolyte membrane assembly according to comparative example 2A was prepared with the electrodes according to comparative example 1A by a similar method to Example 1A.

Comparative Example 2A 3.25 g of ultra pure water was added to 3.5 g of the proton-conducting polymer according to Example 1A in a dry state, and the mixture was stirred in a hybrid mixer (Keyence) for 5 minutes for homogeneously spreading water. Then, 3.25 g of isopropanol was added. The mixture was stirred at 60° C., thereby obtaining a composition E1 as a proton-conducting polymer composition according to comparative example 2A. However, composition E1 was so incompletely homogenized and solidified in a jellied state that the same could not be handled as an excellent proton-conducting polymer composition. Therefore, preparation of electrodes and an electrode-electrolyte membrane assembly was stopped. The content of the proton-conducting polymer in composition E1 is 35 mass %. The ratio of water accounting for the mixed solvent of water and the organic solvent is 50 mass %. Table 2 shows the solvent composition in composition E1 and absorption coefficient at 750 nm.

Comparative Example 3A

A composition F1 as a proton-conducting polymer composition according to comparative Example 3A, a catalyst ink, electrodes and an electrode-electrolyte membrane assembly were prepared by the method of Example 1A except that commercially available Nafion (registered trademark) was employed in place of the aromatic hydrocarbon-based proton-conducting polymer. Table 2 shows the solvent composition in composition F1 and absorption coefficient at 750 nm. Similarly to comparative example 1A, catalyst layers were remarkably uneven.

TABLE 2

| Name of Sample | Polymer | Composition of Solvent (polymer/water/isopropanol/ ethylene glycol dimethylether) | Absorption Coefficient at 750 nm $(cm^{-1}\%^{-1})$ | Remarks |
|---|---|---|---|---|
| Composition A1 | Polymer A1 | 2/4.94/33.06/0 | to 0.001 | Example 1A |
| Composition B1 | | 2/11/27/0 | to 0.001 | Example 2A |
| Composition C1 | | 2/3/12/3 | 0.012 | Example 3A |
| Composition D1 | | 2/2.54/35.46/0 | to 0.001 | Comparative Example 1A |
| Composition E1 | | 3.5/3.25/3.25/0 | — | Comparative Example 2A |
| Composition F1 | Nafion | 2/4.94/33.06/0 | 0.003 | Comparative Example 3A |

FIG. 1 is a diagram showing the relation between viscosity levels of proton-conducting polymer compositions according to Examples and comparative example and frequencies (shear rates). FIG. 1 shows results of evaluating viscosity levels of the proton-conducting polymer compositions according to Examples 1A, 2A and 3A and comparative example 1A.

It has been recognized that the proton-conducting polymer composition according to each Example is a composition whose viscosity abruptly lowers following increase of the frequency, i.e., a composition exhibiting structural viscosity, while the proton-conducting polymer composition according to comparative example is a composition whose viscosity has small dependence on the frequency (i.e., shear rate). Comparing handleability in preparation of catalyst inks, the catalyst ink according to Example 1A exhibited excellent dispersibility with no precipitation of the catalyst or the like, while a problem of precipitation of the catalyst was partially observed in the catalyst ink according to comparative example. Therefore, the proton-conducting polymer composition according to the present invention was superior in handleability in preparation of a catalyst ink for a fuel cell. While it seemed to be difficult to mix the catalyst ink according to Example 1A in preparation of the catalyst ink due to the high viscosity in the static state, it was possible to immediately obtain a homogeneous catalyst ink since the viscosity abruptly lowered when stirring was started.

Table 3 shows results of evaluating power generability levels of the electrode-electrolyte membrane assemblies according to Example 1A and comparative examples 1A and 3A. In the stage of initial performance, it has been confirmed that Example 1A has an excellent bonding state with a resistance value smaller than those of the electrode-electrolyte membrane assemblies according to comparative examples. Particularly in Example 1A and comparative example 1A, difference is recognized between the resistance values although the electrodes contained the same amounts of the same proton-conducting polymers. This is supposed to be because homogeneity of the catalyst layers was superior in Example. After 300-hour continuous power generation, the resistance value of a fuel cell employing the electrode-electrolyte membrane assembly according to comparative example 3A remarkably increased. When power generation was stopped in this stage and the cells were decomposed, flaking of the electrodes was observed in the electrode-electrolyte membrane assembly according to comparative example 3A. Influence thereof was remarkable on the anode side. Also in the electrode-electrolyte membrane assembly according to comparative example 1A, increase of the resistance was observed although this increase was smaller than that in comparative example 3A. Considering that the resistance had been high in the stage of initial power generation, it is estimated that the bonding state was distributional and the catalyst layers were flaked from insufficiently bonded portions. When the cell was decomposed, partial flaking of the catalyst layers forming the electrodes was observed. On the other hand, the electrode-electrolyte membrane assembly according to Example exhibited no conspicuous change, but maintained excellent bondability after generating power for 300 hours. In the assembly of the electrodes containing the catalyst inks prepared with the proton-conducting polymer composition according to the present invention and the electrolyte membrane composed of the non-fluoric proton-conducting polymer, therefore, it was possible to overcome a problem of defective bonding having arisen in Nafion etc. While the power generability shown in Example relates to a fuel cell using a hydrocarbon-based fuel as an example, the electrode-electrolyte membrane assembly according to the present invention is similarly utilizable also in a fuel cell fueled by hydrogen or the like.

TABLE 3

| | Initial Power Generation | | | Resistance after Lapse of 300 Hours |
|---|---|---|---|---|
| | OCV/V | Voltage/V @100 mA/cm$^2$ | Resistance/ m$\Omega \cdot$ cm$^2$ | Resistance/ m$\Omega \cdot$ cm$^2$ |
| Example 1A | 0.64 | 0.32 | 187 | 185 |
| Comparative Example 1A | 0.63 | 0.29 | 214 | 252 |
| Comparative Example 3A | 0.64 | 0.31 | 201 | 281 |

Examples 1B to 9B and Comparative Examples 1B to 3B

Various measurements were conducted as follows:
<Ion Exchange Capacity (Acidic) of Proton-Conducting Polymer>

As to ion exchange capacity (IEC), the amount of acidic functional groups present in each proton-conducting polymer was measured. As sample preparation, polymer powder was dried in an oven of 80° C. under a nitrogen flow for 2 hours, stood to cool in a desiccator filled with silica gel, and thereafter subjected to measurement of the dry mass (Ws). Then, 200 ml of 1 mol/l sodium chloride ultra pure aqueous solution and the aforementioned weighed sample were introduced into a closed glass bottle of 200 ml and stirred at the room temperature for 24 hours in the closed state. Then, the mixture was filtrated through a glass filter. 30 ml of the filtrate was taken out and subjected to neutralization titration with 10 mM of aqueous sodium hydroxide (commercially available standard solution), for obtaining IEC from the titer (T) as follows:

IEC(meq/g)=10 T/(30 Ws)×0.2

(unit of T: ml, unit of Ws: g)

<Method of Measuring Molecular Weight in Terms of Polyethylene Glycol>

The molecular weight of each proton-conducting polymer was measured as the molecular weight in terms of polyethylene glycol through GPC. Shodex GPC SYSTEM-21 was employed as the measuring apparatus. A column was prepared by connecting a TSKgel G2000H$_{XL}$ column by TOSOH to two TSKgel GMX$_{XL}$ columns by TOSOH. A solvent prepared by dissolving 30 mM of LiBr and 60 mM of phosphoric acid in N,N-dimethylformamide was employed at a temperature of 40° C. and a flow rate of 0.7 ml/min. An R$_1$ detector was employed as a detector. The molecular weight was calculated in terms of standard polyethylene glycol. Each sample was dissolved in the solvent to be 0.05 mass % in terms of polymer solid, and thereafter injected by 20 μl.

<Measurement of Visible Absorption Spectrum>

Absorbance (E) with respect to visible light of 750 nm was measured with a double beam spectrophotometer HITACHI U-2001 according to "General Rules for Absorption Spectrophotometry" JIS K0115 (2004). A mixture of only a solvent containing no proton-conducting polymer was employed as a control. An iodine tungsten lamp was employed as a light source. The absorbance (E) is obtained as follows:

E=log(Io/It) (Io: intensity of incident light, It: intensity of transmitted light)

Then, absorption coefficient ($\epsilon[\text{cm}^{-1}\%^{-1}]$) was calculated as follows:

Absorption coefficient($\epsilon$)=E(absorbance)/[1(cell length)·C(polymer concentration: %)]

<Logarithmic Viscosity of Proton-Conducting Polymer Composition>

Proton-conducting polymer powder was dissolved in N-methylpyrrolidone in a concentration of 0.5 g/dl, subjected to viscosity measurement with an Ubbelohde viscometer in a thermostat of 30° C. and evaluated through logarithmic viscosity ln [ta/tb]/c (ta: drop time (sec.) of sample solution, tb: drop time (sec.) of only solvent, c: polymer concentration).

<Power Generability>

Each electrode-electrolyte membrane assembly was incorporated into a self-made fuel cell evaluation cell and aged by generating power for 16 hours with a fuel cell evaluator by NF Corporation while supplying a fuel of hydrogen gas and air to an anode and a cathode respectively at a cell temperature of 80° C. Then, initial performance was evaluated by checking a current-potential curve. Further, durability was measured by checking voltage stability while conducting a constant current continuous discharge test for 500 hours under a current density of 500 mA/cm$^2$.

Samples employed in Examples and comparative examples were prepared as follows:

(Synthesis of Proton-Conducting Polymer)

14 g of a mixture containing 3,3'-disulfo-4,4'-dichlorodiphenylsulfone disodium salt (abbreviation: S-DCDPS), 2,6-dichlorobenzonitrile (abbreviation: DCBN), 4,4'-biphenol and potassium carbonate at the molar ratios 1.00:1.99:2.99:2.5 was weighed out in a four neck flask of 100 ml along with 2.5 g of a molecular sieve and fed with nitrogen. 50 ml of NMP was introduced into the flask and the mixture was stirred at 151° C. for 2 hours, and the reaction temperature was thereafter increased to 190 to 200° C. for continuing reaction with such a measure that the viscosity of the system increased. At this time, the reaction time was varied for synthesizing proton-conducting polymers having different molecular weight distributions. After standing to cool, the precipitating molecular sieve was removed and the residues were sedimented in water in a stranded manner. An operation of washing the obtained polymers in boiling water for 1 hour was repeated twice. Then, the polymers were dipped in 1 liter of aqueous hydrochloric acid of 1 mol/liter over one night with stirring, thereafter the operation of washing the same in boiling water for 1 hour was repeated seven times again and the polymers were thereafter dried under reduced pressure, for obtaining polymers A2, B2 and C2 as aromatic hydrocarbon-based proton-conducting polymers having different molecular weights in terms of polyethylene glycol, as shown in Table 4.

TABLE 4

|  | Ion Exchange Capacity (meq/g) | Logarithmic Viscosity (dl/g) | Weight-Average Molecular Weight | Ratio of Component Having Molecular Weight of 2000 to 23000 (mass %) |
| --- | --- | --- | --- | --- |
| Polymer A2 | 1.43 | 0.42 | 22000 | 52 |
| Polymer B2 | 1.44 | 0.81 | 42300 | 13 |
| Polymer C2 | 1.43 | 1.32 | 77500 | 2 |

(Preparation of Proton-Conducting Polymer Composition)

Polymers A2, B2 and C2 which are the aromatic hydrocarbon-based proton-conducting polymers shown in Table 4 and a 1-to-2 mixture of polymers A2 and C2 were dissolved and dispersed to have the following three types of mass ratios, thereby obtaining compositions A2 to L2 as proton-conducting polymer compositions containing 5 mass % of the proton-conducting polymers. Ultra pure water was employed as water, with a reagent-grade organic solvent.

(1) proton-conducting polymer/water/1,2-dimethoxyethane=5/10/85

(2) proton-conducting polymer/water/1,2-dimethoxyethane/methanol=5/5/23/67

(3) proton-conducting polymer/water/cyclohexanone=5/5/1990

Table 5 shows absorbance levels measured as to the respective compositions. The respective compositions were classified into compositions according to Examples 1B to 9B and compositions according to comparative examples 1B to 3B.

TABLE 5

| Name of Sample | Polymer | Composition of Solvent | Absorption Coefficient at 750 nm (cm$^{-1}$%$^{-1}$) | Remarks |
| --- | --- | --- | --- | --- |
| Composition A2 | Polymer A2 | (1) | 0.48 | Example 1B |
| Composition B2 |  | (2) | 0.44 | Example 2B |
| Composition C2 |  | (3) | to 0.001 | Example 3B |
| Composition D2 | Polymer B2 | (1) | 0.36 | Example 4B |
| Composition E2 |  | (2) | 0.013 | Example 5B |
| Composition F2 |  | (3) | to 0.001 | Example 6B |
| Composition G2 | Polymer C2 | (1) | 0.2 | Comparative Example 1B |
| Composition H2 |  | (2) | 0.005 | Comparative Example 2B |
| Composition I2 |  | (3) | to 0.001 | Comparative Example 3B |
| Composition J2 | Polymer A2 + | (1) | 0.29 | Example 7B |
| Composition K2 | Polymer C2 | (2) | 0.15 | Example 8B |
| Composition L2 | (1/2) | (3) | to 0.001 | Example 9B |

(Preparation of Catalyst Ink)

The aforementioned compositions were added to a commercially available 40% platinum carbon catalyst (Tanaka Kikinzoku Kogyo Kabushiki Kaisha) and stirred to be homogeneous, thereby obtaining catalyst inks for fuel cells according to Examples and comparative examples. Electrodes prepared from the compositions with the numbers of Examples are regarded as electrodes of the numbers of Examples as such. For example, electrodes prepared from the composition according to Example 1B are regarded as electrodes according to Example 1B. The catalyst-carrying carbon and the proton-conducting polymers contained in the compositions were so adjusted that the mass ratio therebetween was 1:0.28.

(Preparation of Electrode)

Each catalyst ink was applied onto commercially available carbon papers (E-Tek) and dried, thereby preparing electrodes for a fuel cell. At this time, the carbon paper for the anode was formed by a hydrophilic carbon paper, and the carbon paper for the cathode was formed by a carbon paper rendered hydrophobic.

(Preparation of Electrolyte Membrane)

Polymer C2 shown in Table 4 was dissolved in NMP (25%) and cast on a glass plate provided on a hot plate by casting, NMP was distilled away until the mixture was filmy, and the film was dipped in water over one night. Further, an operation of washing the membrane with ultra pure water for 1 hour was repeated five times. Thereafter the membrane was framed and dried at the room temperature, thereby obtaining an aromatic hydrocarbon-based polymer electrolyte membrane.

(Preparation of Electrode-Electrolyte Membrane Assembly)

The aforementioned electrolyte membrane was equibrated with moisture under an atmosphere of 20° C. having humidity of 80 RH%, and thereafter held between the aforementioned two types of electrodes (anode and cathode) under the same environment so that surfaces coated with the catalyst ink were in contact with the electrolyte membrane. This laminate of the electrodes and the electrolyte membrane was held between two stainless plates along with a gasket. Then, the laminate was hot-pressed at 130° C. under pressure, so that the electrodes and the electrolyte membrane were bonded to each other. The laminate was taken out in the state held between the stainless plates and naturally cooled to the room temperature, thereby obtaining each of electrode-electrolyte membrane assemblies according to Examples and comparative examples. Electrode-electrolyte membrane assemblies prepared with the electrodes of the numbers of Examples are regarded as electrode-electrolyte membrane assemblies of the numbers of Examples as such. For example, electrodes prepared with the electrodes according to Example 1B are regarded as the electrode-electrolyte membrane assembly according to Example 1B.

A fuel cell power generation test was conducted on the electrode-electrolyte membrane assemblies according to Examples 1B to 9B and comparative examples 1B to 3B. At this time, internal resistance values of the cells were measured by a current interrupting method along with measurement of current-voltage curves. While performance of catalytic activity can be determined from a voltage value in a low current density region of a current-voltage curve, a voltage drop resulting from internal resistance of a cell may be erroneously regarded as a voltage drop resulting from poor catalytic performance, and hence a resistance-free voltage obtained by removing a resistance component of each cell was regarded as an index of catalytic activity and obtained as follows:

$E$(resistance-free voltage)=$E$real(actually measured voltage)−$R$(internal resistance)$I$(current density)

Table 6 shows results of measuring resistance-free voltages at a current density of 0.1 A cm$^2$.

TABLE 6

|  | Voltage @0.1 A/cm$^2$ (V) |
|---|---|
| Example 1B | 0.845 |
| Example 2B | 0.842 |
| Example 3B | 0.843 |
| Example 4B | 0.837 |
| Example 5B | 0.836 |
| Example 6B | 0.836 |
| Example 7B | 0.843 |
| Example 8B | 0.841 |
| Example 9B | 0.842 |
| Comparative Example 1B | 0.792 |
| Comparative Example 2B | 0.801 |
| Comparative Example 3B | 0.787 |

It is understood from Table 6 that each of the fuel cells prepared from compositions containing proton-conducting polymers containing at least 10 mass % of components having molecular weights of 2000 to 23000 in terms of polyethylene glycol according to Examples exhibited a high resistance-free voltage at 0.1 A/cm$^2$ with development of excellent catalytic performance. On the other hand, no sufficient catalytic performance was attained in the fuel cells according to comparative examples. While the values of absorption coefficient in Table 5 serve as indices of dispersion or dissolution states of the proton-conducting polymers in the compositions, such a tendency was recognized that neither contributed to development of catalytic performance. As to a composition containing an aromatic hydrocarbon-based proton-conducting polymer, therefore, it is particularly important to adjust the molecular weight of the aromatic hydrocarbon-based proton-conducting polymer in the range according to the present invention.

As to electrodes of a fuel cell, it is important to excellently keep gas diffusivity in the electrodes along with catalytic activity, depending on the method of using the fuel cell. Inferior gas diffusivity in the electrodes is unpreferable in this case since it tends to be difficult to feed a high current. From this point of view, values of current densities with a voltage of 0.2 V were checked in the current-potential curves of the fuel cells according to Examples 1B to 9B exhibiting excellent catalytic activity. Table 7 shows the results.

TABLE 7

|  | Current Density @ 0.2 V (A/cm$^2$) |
|---|---|
| Example 1B | 0.8 |
| Example 2B | 0.91 |
| Example 3B | 1.91 |
| Example 4B | 1.01 |
| Example 5B | 1.85 |
| Example 6B | 1.95 |
| Example 7B | 1.36 |
| Example 8B | 1.67 |
| Example 9B | 1.88 |

It is understood from Table 7 that the values of the current densities at 0.2 V are different from each other among Examples and this tendency is particularly excellent in Examples 3B, 5B, 6B, 7B, 8B and 9B exhibiting small absorbance values of the compositions. Therefore, it is possible to superiorly operate a fuel cell by employing a proton-conducting polymer composition having absorption coefficient in the range of 0 to 0.3 cm$^{-1}$%$^{-1}$. At this time, the absorption coefficient tends to increase as the molecular weight of the proton-conducting polymer is reduced, and hence it tends to be difficult to adjust the proton-conducting polymer composition.

In relation to the fuel cells according to Examples 3B and 9B, durability levels were compared by performing continuous power generation for 500 hours. Consequently, the initial voltage of 0.72 V at 0.5 A/cm$^2$ was slightly reduced to 0.68 V in the fuel cell according to Example 3B, while the voltage in the fuel cell according to Example 9B substantially constantly shifted from an initial level of 0.71 V in the range up to 0.72 V. When employing a composition mixedly containing a proton-conducting polymer containing a component having a higher molecular weight along with a component having a molecular weight of 2000 to 23000 in terms of polyethylene glycol, therefore, it was possible to superiorly operate the fuel cell.

The proton-conducting polymer composition according to the present invention is a composition prepared by dispersing or dissolving an aromatic hydrocarbon-based proton-conducting polymer, and has excellent bondability to an aromatic hydrocarbon-based polymer electrolyte membrane in particular. In relation to a fuel cell prepared by using a solution (5 mass %) of commercially available Nafion (registered trademark) which is a composition in which a fluoric proton-conducting polymer is dispersed as comparative example 4B, a similar durability test was conducted. Consequently, the voltage was reduced to 0.61 V after a lapse of 500 hours, although the initial voltage was excellently at 0.72 V. When internal resistance of the fuel cell was measured by a current interrupting method in order to specify the cause therefor, resistance increase not recognized in a case of employing the inventive proton-conducting polymer composition was observed. This is inferably because bondability on interfaces between electrodes and a polymer electrolyte membrane was reduced.

While the power output shown in the aforementioned Examples relates to fuel cells fueled by hydrogen, for example, the present invention is similarly applicable to a fuel cell using a hydrocarbon-based fuel such as methanol.

Industrial Availability

By employing the proton-conducting polymer composition according to the present invention, catalyst layers of fuel cell electrodes can be stably formed by blending a catalyst for fuel cell electrodes. The catalyst layers develop excellent catalytic performance, and bondability between electrodes and an electrolyte membrane is excellent in an assembly of the electrodes having these catalyst layers and the electrolyte membrane. Therefore, the proton-conducting polymer composition and the catalyst ink according to the present invention are useful not only for a fuel cell using a hydrocarbon-based fuel but also for a fuel cell fueled by hydrogen or the like.

The invention claimed is:

1. A proton-conducting polymer composition comprising an aromatic hydrocarbon-based proton-conducting polymer and at least one solvent,
   wherein the content of said proton-conducting polymer is in the range of 1 to 30 mass %,
   wherein a component of said proton-conducting polymer having a molecular weight in the range of 2000 to 23000 in terms of polyethylene glycol accounts for at least 10 mass % of the total amount of said proton-conducting polymer,
   wherein said aromatic hydrocarbon-based proton-conducting polymer comprises a sulfonated polyarylene ether-based polymer, and
   wherein said aromatic hydrocarbon-based proton-conducting polymer comprises a component represented by the following formula (5)

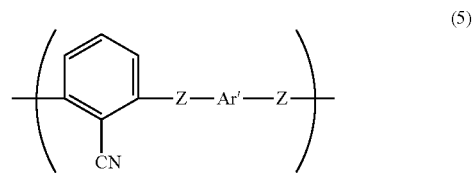

wherein Ar' is selected from a bivalent aromatic group and Z is selected from direct bonding, ether bonding, and thioether bonding.

2. The proton-conducting polymer composition according to claim 1, wherein
   the molecular weight distribution of said proton-conducting polymer has at least two maximal values, and at least one of said maximal values exhibits a molecular weight in the range of 2000 to 23000 in terms of polyethylene glycol while at least another one of the maximal values exhibits a molecular weight in the range greater than 23000 in terms of polyethylene glycol.

3. The proton-conducting polymer composition according to claim 2, wherein
   the maximal value exhibiting the molecular weight in the range greater than 23000 in terms of polyethylene glycol in the molecular weight distribution of said proton-conducting polymer is in the range of the molecular weight of 50000 to 120000 in terms of polyethylene glycol.

4. The proton-conducting polymer composition according to claim 1, wherein the at least one solvent comprises water in the range of 1 to 45 mass % and an organic solvent in the range of 50 to 98 mass %.

5. The proton-conducting polymer composition according to claim 1, wherein
   absorption coefficient in a visible light absorption spectrum at 750 nm is in the range of 0 to 0.3 cm$^{-1}$·%$^{-1}$.

6. The proton-conducting polymer composition according to claim 1, exhibiting structural viscosity.

7. The proton-conducting polymer composition according to claim 1, wherein
   the content of sulfonic acid groups in said proton-conducting polymer is in the range of 0.3 to 3.5 meq/g.

8. A method for preparing a proton-conducting polymer composition for obtaining the proton-conducting polymer composition according to claim 1, at least having the step of adding a first solvent to said proton-conducting polymer and thereafter further adding a second solvent having a smaller solubility parameter than said first solvent.

9. The method for preparing a proton-conducting polymer composition according to claim 8, wherein
   said first solvent is water, and said second solvent is an organic solvent.

10. A method for preparing a proton-conducting polymer composition for obtaining the proton-conducting polymer composition according to claim 2, at least having the step of adding a first solvent to said proton-conducting polymer and thereafter further adding a second solvent having a smaller solubility parameter than said first solvent.

11. A method for preparing a proton-conducting polymer composition for obtaining the proton-conducting polymer composition according to claim 3, at least having the step of adding a first solvent to said proton-conducting polymer and thereafter further adding a second solvent having a smaller solubility parameter than said first solvent.

12. A method for preparing a proton-conducting polymer composition for obtaining the proton-conducting polymer composition according to claim 4, at least having the step of adding a first solvent to said proton-conducting polymer and thereafter further adding a second solvent having a smaller solubility parameter than said first solvent.

13. A method for preparing a proton-conducting polymer composition for obtaining the proton-conducting polymer composition according to claim 7, at least having the step of adding a first solvent to said proton-conducting polymer and thereafter further adding a second solvent having a smaller solubility parameter than said first solvent.

14. A catalyst ink having the proton-conducting polymer composition according to claim 1 and a catalyst.

15. A fuel cell into which an electrode-electrolyte membrane assembly formed by stacking electrodes prepared from the catalyst ink according to claim 14 and a polymer electrolyte membrane composed of said proton-conducting polymer are incorporated.

16. A catalyst ink having the proton-conducting polymer composition according to claim 2 and a catalyst.

17. A catalyst ink having the proton-conducting polymer composition according to claim 3 and a catalyst.

18. A catalyst ink having the proton-conducting polymer composition according to claim 4 and a catalyst.

19. A catalyst ink having the proton-conducting polymer composition according to claim 7 and a catalyst.

* * * * *